No. 880,069. PATENTED FEB. 25, 1908.
J. A. GARMS.
TRAWLING NET FOR USE IN HERRING OR OTHER FISHING.
APPLICATION FILED JAN. 8, 1907.
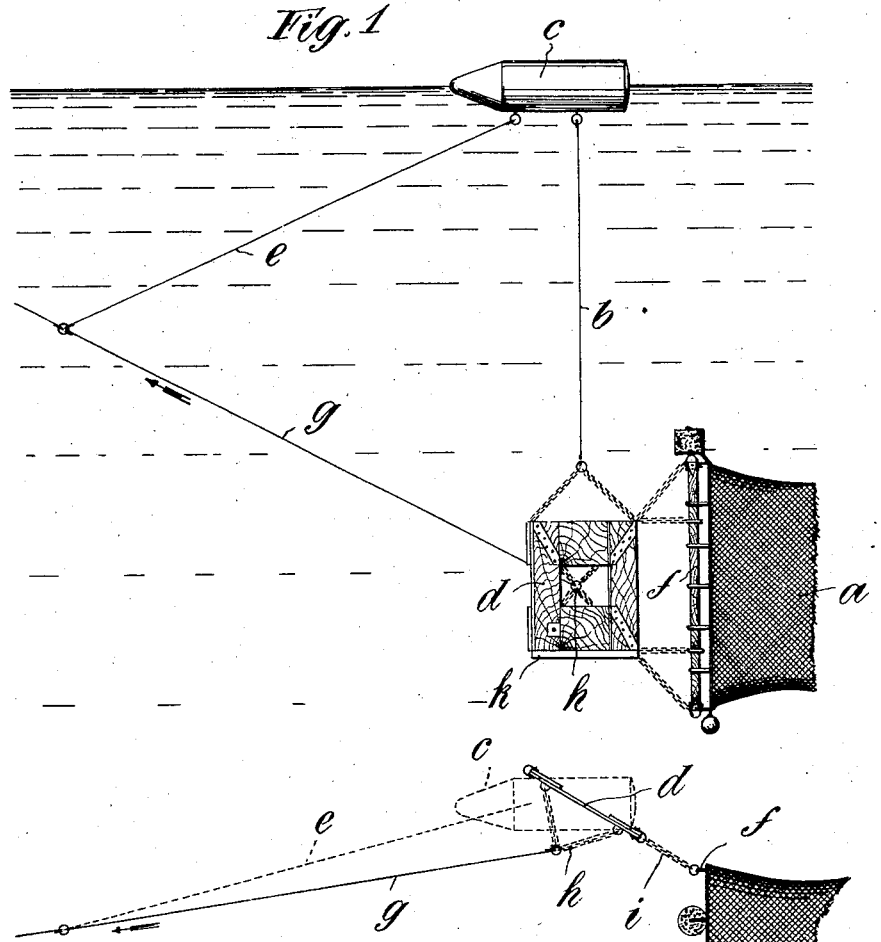
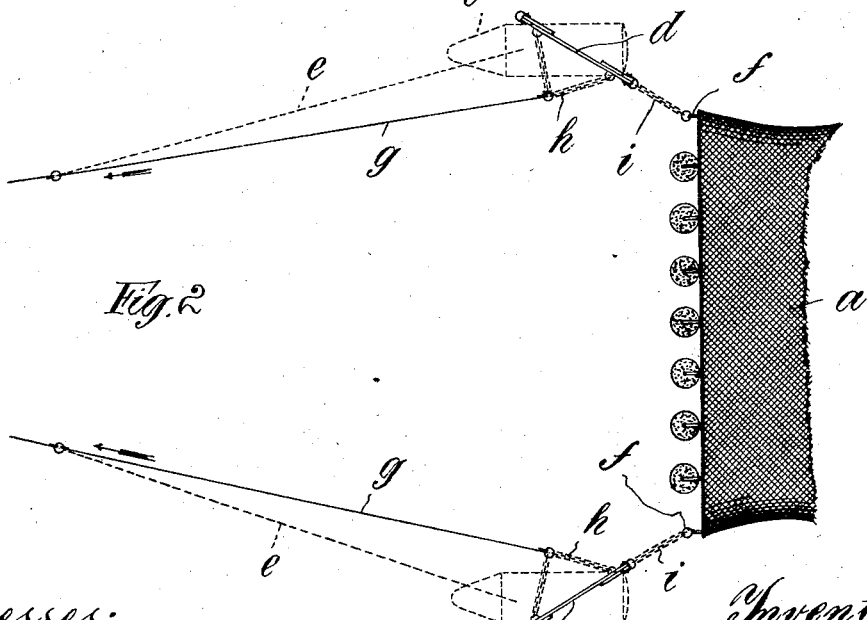

UNITED STATES PATENT OFFICE.

JOHANNES AUGUST GARMS, OF VAREL-HAFEN, GERMANY.

TRAWLING-NET FOR USE IN HERRING OR OTHER FISHING.

No. 880,069.     Specification of Letters Patent.     Patented Feb. 25, 1908.

Application filed January 8, 1907. Serial No. 351,320.

*To all whom it may concern:*

Be it known that I, JOHANNES AUGUST GARMS, a subject of the Emperor of Germany, resident of Varel-Hafen, Oldenburg, Germany, have invented new and useful Improvements in or Relating to Trawling-Nets for Use in Herring or other Fishing, of which the following is a description.

This invention relates to improvements in connection with that class of trawling nets for herring-fishing with "otter" boards and spreading bars.

The invention consists in the peculiar connection of the "otter" boards with the bars in a manner, that the spreading bars according to the necessary vertical height of the net may be made 15-25 feet in length without having to fear that the net will become fouled in consequence of the length of the beams.

The connection of the spreading-bars with the "otter" boards is no longer rigid, as before, but both parts have a certain freedom of motion. On account of this arrangement the spreading bars, which are connected with the "otter" boards by chains, may be behind the boards and project beyond the same at the top and bottom, without turning the boards out of their prescribed course. The net is still further specially prevented from deviation by connecting the floats of the depth adjusting arrangement by a rope with the trawling rope.

In the accompanying drawings Figure 1 is a side elevation and Fig. 2 a plan.

The mouth or opening of the net $a$ is a flat rectangle, the upper and lower edges lying horizontally in position of use. The mouth is spread by "otter" or "shear" boards $d$ fastened to the vertical edges. These latter are stiffened by spreading-bars $f$. The connection of the bars with the boards $d$ is made by chains $i$, so that the boards and bars have free movement.

By ropes $b$ the otter-boards $d$ are suspended from a float $c$ of suitable form. The floats are in connection with the trawling ropes $g$ by ropes $e$. The trawling ropes are connected with the otter-boards by chain-crosses $h$ the ends of which are attached to the boards at their corners. The boards have an opening in the middle in order to cause less resistance in water while being trawled. The boards manufactured of wood are protected with plates $k$ of metal for the purpose of overcoming their buoyancy. The length of the suspending ropes $b$ is capable of variation for adjustment according to the depth below the surface of the water at which the boards with the net attached thereto are required for use. By the rope-connection $e$ each float is vertically kept above its corresponding otter-board.

In order to make the opening at the mouth of the net greater at the top there may be attached floats of cork and the bottom may be provided with some load.

What I claim as my invention is:

1. In trawling nets for herring fishing the combination of a net with a rectangular opening with long stiffening bars at its vertical edges, shear boards, connecting chains for the boards and bars, trawling ropes, chain crosses connecting the ropes and boards, means for keeping the net at a suitable depth as and for the purpose specified.

2. In trawling nets for herring fishing the combination of a net provided with an opening and with long stiffening bars for the opening, shearboards connected with the bars, floats bearing the boards, trawling ropes connected with the boards, ropes connecting the floats and the trawling ropes.

In witness whereof I have hereunto set my hand in the presence of two witnesses.

JOHANNES AUGUST GARMS.

Witnesses:
    FERD. REICH,
    FR. HOYERMANN.